US012098575B2

(12) United States Patent
Graham

(10) Patent No.: US 12,098,575 B2
(45) Date of Patent: Sep. 24, 2024

(54) TRANSVERSE CONCEALED LATCH SYSTEM

(71) Applicant: Schlage Lock Company LLC, Carmel, IN (US)

(72) Inventor: Matthew S. Graham, Noblesville, IN (US)

(73) Assignee: Schlage Lock Company LLC, Carmel, IN (US)

( * ) Notice: Subject to any disclaimer, the term of this patent is extended or adjusted under 35 U.S.C. 154(b) by 143 days.

(21) Appl. No.: 17/735,311

(22) Filed: May 3, 2022

(65) Prior Publication Data

US 2022/0333409 A1 Oct. 20, 2022

Related U.S. Application Data

(63) Continuation of application No. 16/573,576, filed on Sep. 17, 2019, now Pat. No. 11,319,729, which is a continuation of application No. 14/791,752, filed on Jul. 6, 2015, now Pat. No. 10,415,271.

(60) Provisional application No. 62/020,802, filed on Jul. 3, 2014.

(51) Int. Cl.

| | |
|---|---|
| ***E05B 65/10*** | (2006.01) |
| ***E05B 15/02*** | (2006.01) |
| ***E05B 53/00*** | (2006.01) |
| ***E05C 3/02*** | (2006.01) |

(Continued)

(52) U.S. Cl.

CPC ...... *E05B 65/1013* (2013.01); *E05B 15/0205* (2013.01); *E05B 53/003* (2013.01); *E05B 65/1053* (2013.01); *E05C 3/02* (2013.01); *E05C 3/14* (2013.01); *E05C 9/00* (2013.01)

(58) Field of Classification Search

CPC ... Y10T 292/1039; E05B 81/14; E05B 85/26; E05B 47/0607

See application file for complete search history.

(56) References Cited

U.S. PATENT DOCUMENTS

| | | | |
|---|---|---|---|
| 1,585,167 | A | 5/1926 | Palmer |
| 1,817,689 | A | 8/1931 | Hormes |
| 2,887,336 | A | 5/1959 | Meyer |

(Continued)

OTHER PUBLICATIONS

Canadian Office Action; Canadian Intellectual Property Office; Canadian Patent Application No. 2,896,448; Oct. 13, 2016; 5 pages.

*Primary Examiner* — Mark A Williams
(74) *Attorney, Agent, or Firm* — Taft Stettinius & Hollister LLP

(57) ABSTRACT

A latch mechanism having a latch apparatus that is pivotally displaced about a latch axis and a cam device is that pivotally displaced along a transverse cam axis. The cam device is configured to operably engage the latch apparatus so as to at least assist in securing the latch apparatus in a locked position. When the latch apparatus is to be displaced to an unlocked position, the cam device may be pivoted about the transverse cam axis to a position in which the cam device does not impede with the pivotal displacement of the latch apparatus. The latch apparatus may also be configured to prevent the pivotal displacement of the cam device when the latch apparatus is in the unlocked position. According to other embodiments, the latch apparatus may be pivotally displaced about a transverse latch axis by the displacement of a latch link.

16 Claims, 13 Drawing Sheets

(51) Int. Cl.
*E05C 3/14* (2006.01)
*E05C 9/00* (2006.01)

(56) References Cited

U.S. PATENT DOCUMENTS

| | | | | |
|---|---|---|---|---|
| 2,932,536 | A | 4/1960 | Pyknen | |
| 3,124,378 | A | 3/1964 | Jackson | |
| 3,214,947 | A * | 11/1965 | Wikkerink | E05B 65/1066 70/92 |
| 3,563,585 | A | 2/1971 | Welch | |
| 3,583,740 | A * | 6/1971 | Armstrong | E05B 65/1013 292/210 |
| 3,600,022 | A * | 8/1971 | Armstrong | E05B 65/1013 292/237 |
| 4,315,648 | A | 2/1982 | Labelle | |
| 4,601,499 | A | 7/1986 | Kim | |
| 4,929,007 | A | 5/1990 | Bartczak et al. | |
| 5,114,192 | A * | 5/1992 | Toledo | E05B 63/20 292/21 |
| 5,154,454 | A | 10/1992 | Hollaway | |
| 5,290,077 | A | 3/1994 | Fleming | |
| 5,586,458 | A * | 12/1996 | Weinerman | E05C 3/24 70/472 |
| 5,702,134 | A * | 12/1997 | Hsieh | E05B 65/1046 292/DIG. 60 |
| 5,864,936 | A | 2/1999 | Riley et al. | |
| 6,409,231 | B1 | 6/2002 | Rusiana | |
| 6,786,519 | B2 | 9/2004 | Gartner | |
| 7,287,784 | B2 | 10/2007 | Lin | |
| 7,353,673 | B2 | 4/2008 | Houlihan et al. | |
| 7,878,032 | B1 | 2/2011 | Gogel | |
| 8,267,440 | B2 | 9/2012 | Shen | |
| 2005/0194791 | A1 | 9/2005 | Udriste et al. | |
| 2010/0045052 | A1* | 2/2010 | Kutschat | E05B 79/20 292/196 |
| 2010/0117376 | A1 | 5/2010 | Shen | |
| 2013/0127181 | A1* | 5/2013 | Rocchitelli | D06F 39/14 292/182 |
| 2013/0154283 | A1* | 6/2013 | Arlinghaus | E05B 47/023 292/214 |
| 2013/0270840 | A1* | 10/2013 | Lujan | E05C 19/12 292/96 |
| 2014/0132009 | A1* | 5/2014 | Chiang | E05C 3/124 292/164 |
| 2015/0021927 | A1* | 1/2015 | Wang | E05B 65/00 292/99 |

* cited by examiner

TRANSVERSE CONCEALED LATCH SYSTEM

CROSS-REFERENCE TO RELATED APPLICATIONS

The present application is a continuation of U.S. application Ser. No. 16/573,576 filed Sep. 17, 2019 and issued as U.S. Pat. No. 11,319,729, which is a continuation of U.S. application Ser. No. 14/791,752 filed Jul. 6, 2015 and issued as U.S. Pat. No. 10,415,271, which claims the benefit of U.S. Provisional Patent Application No. 62/020,802 filed Jul. 3, 2014, the contents of each application hereby incorporated by reference in their entirety.

BACKGROUND

Embodiments of the present invention generally relate to a concealed latch assembly for exit devices. More specifically, embodiments of the present invention relate to latch assemblies that utilize pivotal displacement of one or more components of the latch assemblies along a transverse axis.

Multi-point exit devices often provide a relatively high degree of strength due to the multiple latching points of the exit device. During operation, when a closed door is to be displaced to an open position, a push bar of the multi-point exit device is typically depressed so that the top and bottom latches or bolts are retracted from locked positions to unlocked positions. The latches or bolts are also often maintained in the retracted positions as the door is displaced from the closed position so as to prevent the latches or bolts from dragging across an adjacent surface. For example, by retaining a linearly displaced bottom bolt in a retracted position, the bottom bolt may not be dragged across the floor as the door is displaced from, and subsequently returned to, the closed position.

Some exit devices contain components that are concealed within an inner region or cavity of the door. Thus, the inner region or cavities for such systems are typically sized to accommodate not only the physical size of the concealed exit device components, but also to provide sufficient space for the operation, such as pivotal and/or linear displacement, of those concealed components within the door. Yet, the space requirements for such concealed components may adversely impact the strength of the door. Moreover, the relatively large size of the inner region or cavity that is often needed to accommodate the concealed components of the exit device may reduce the material thickness of at least the portion of door that is between the inner region or cavity and the adjacent exterior surface of the door. Additionally, such reductions in the material thickness of the door may be more problematic for doors that are constructed from certain types of materials, such as, for example, wood. In an effort to address such strength issues, certain types of doors are re-enforced with metal covers or casings, which are secured to exterior portions of the door that are adversely affected by the size of the inner region or cavity. Yet, such metal casings or covers may increase the cost of the door, as well as be detrimental to the ornamental appearance of the door.

BRIEF SUMMARY

An aspect of the present invention is a latch mechanism that is adapted to engage a door strike to releasably secure a door in a closed position. The latch mechanism includes a latch apparatus that is configured to be pivotally displaced about a latch axis between a first position and a second position. Additionally, the latch apparatus is adapted to securely engage the door strike when in the first position, and to be releaseable from engagement with the door strike when in the second position. The latch mechanism also includes a cam device that is configured to be pivotally displaced about a transverse cam axis between a first engagement position and a second disengagement position. The cam device is also configured to operably engage the latch apparatus when the cam device is in the first engagement position and the latch apparatus is in the first position so as to prevent the latch apparatus from being displaced to the second position. Additionally, the cam device is configured to not inhibit the displacement of the latch apparatus from the first position to the second position when the cam device is in the second disengagement position. Further, the cam device is adapted for the transverse cam axis to generally extend in the direction of a width of the door, while the latch apparatus is adapted for the latch axis to generally extend in the direction of a length of the door.

Another aspect of the present invention is a latch mechanism that is adapted to engage a door strike to releasably secure a door in a closed position. The latch mechanism includes a latch apparatus that is adapted to be pivotally displaced about a latch axis between a first position and a second position. Additionally, the latch apparatus is adapted for secured placement of at least a portion of the door strike in a retention area of the latch apparatus when the latch apparatus is in the first position. The latch mechanism also includes a cam device that is adapted to be pivotally displaced about a transverse cam axis between a first engagement position and a second disengagement position. The transverse cam axis is generally perpendicular to the latch axis. The cam device also has a cam surface that is configured to engage the latch apparatus when the latch apparatus is in the first position and the cam device is in the first engagement position so as to prohibit displacement of the latch apparatus to the second position. The latch mechanism also includes a latch link that is adapted to be linearly displaced between an extended position and a retracted position. The latch link is operably connected to the cam device, with the cam device being in the second disengagement position when the latch link is in the retracted position, and in the first engagement position when the latch link is in the extended position.

Another aspect of the present invention is a latch mechanism that is adapted to engage a door strike to releasably secure a door in a closed position. The latch mechanism includes a latch apparatus that is configured to be pivotally displaced about a transverse latch axis between a first position and a second position. The latch apparatus is also adapted to abut the door strike when in the first position and to be disengaged from the door strike when in the second position. Further, the transverse latch axis is configured to generally extend in the direction of a width of the door.

Other aspects of the present invention will become apparent by consideration of the detailed description and accompanying drawings.

Figure 1:
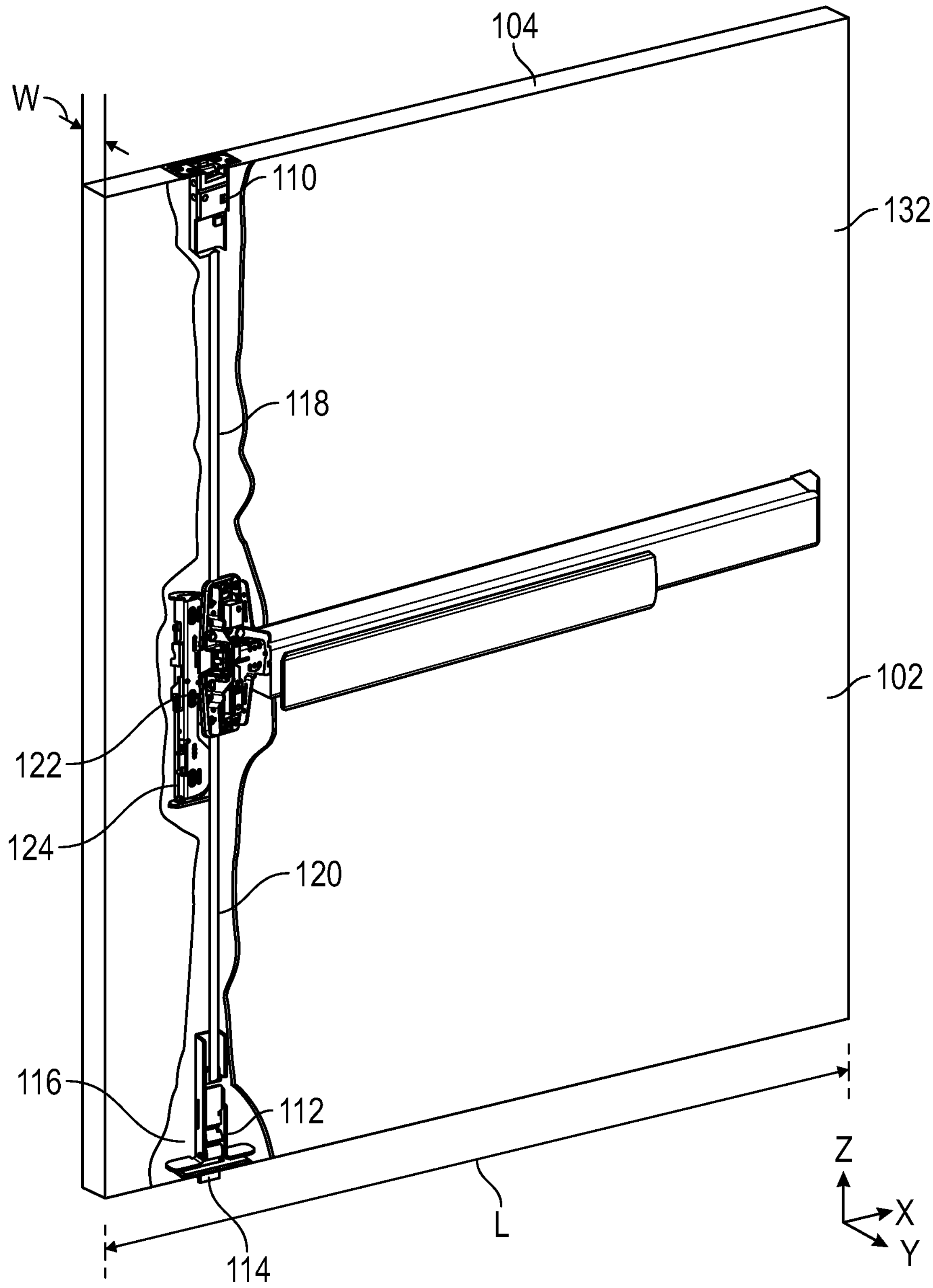
FIG. 1 illustrates a partial cutaway side perspective view of a door having an exit device according to an illustrated embodiment of the present invention.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DESCRIPTION OF THE ILLUSTRATED EMBODIMENTS

Certain terminology is used in the foregoing description for convenience and is not intended to be limiting. Words such as "upper," "lower," "top," and "bottom" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

FIG. 1 illustrates a front perspective view of an exit device 100 that is operably connected to a door 102 according to an embodiment of the present invention. The door 102, which may be constructed from a variety of different materials, including, for example, wood, includes at least two opposing edges, such as, for example, a top edge 104 and a bottom edge 106. According to certain embodiments, the exit device 100 may include a push bar 108 and one or more latch mechanisms, such as, for example, a top latch mechanism 110 and a bottom latch mechanism 112. According to certain embodiments, at least one of the latch mechanisms, such as, for example, the bottom latch mechanism 112, may include a latch bolt 114 that is configured to be linearly displaced between extended and retracted positions. Similarly, according to certain embodiments, one or more of the latch mechanisms, such as, for example, the top latch mechanism 110, may be configured for releaseable engagement with a door strike that is operably secured to an adjacent structure, such as, for example, a door frame or wall. For example, when the door 102 is in a closed position so as to prevent or deter ingress/egress through an entryway, the latch bolt 114 of the bottom latch mechanism 112 may extend into a mating recess in an adjacent structure, such as a recess in a door frame, wall, and/or floor, among other structures, while a door strike extends into, or is otherwise engaged by, the top latch mechanism 110.

At least portions of the exit device 100 may be positioned within an interior region 116 of the door 102, such as, for example, in one or more cavities or channels in the door 102. For example, referencing FIG. 1, according to the illustrated embodiment, the exit device 100 may further include upper and lower pull cables 118, 120, a center case 122, and a center slide assembly 124 that may, at least in part, each be positioned within the interior region 116 of the door 102. Additionally, at least a portion of the top and bottom latch mechanisms 112, 128 may also be positioned within the interior region 116. However, various components of the exit device 100, including a push bar 108, for example, may be positioned at a variety of other locations besides, or in addition to, the interior region 116, including, for example, against or extending from an exterior surface 132 of the door 102, or within other components that are operably secured to the door 102.

Operable displacement of the push bar 108 may provide forces that are translated by the exit device 100 into motion that is used to displace components of the top and bottom latch mechanisms 112, 128 from first, locked positions to second, unlocked positions, thereby allowing the door 102 to be displaced from a closed, locked position to an open, unlocked position. According to the illustrated embodiment, operation, such as operable depressing, of the push bar 108, may provide a pulling force in a first direction, such, as, for example, a pulling force generally along a horizontal axis ("X" axis in FIG. 1) that is transferred to one or more components of the center case 122. The center case 122 may be configured to translate such a pulling force(s) into motion along a second axis, such as, for example, motion generally along a vertical axis ("Z" axis in FIG. 1). Moreover, the center case 122 may translate forces provided by the operation of the push bar 108 into pulling forces by the upper and/or lower pull cables 118, 120 that are used to displace the associated top and bottom latch mechanisms 110, 112 from the first, locked positions to the second, unlocked positions.

Figure 2:
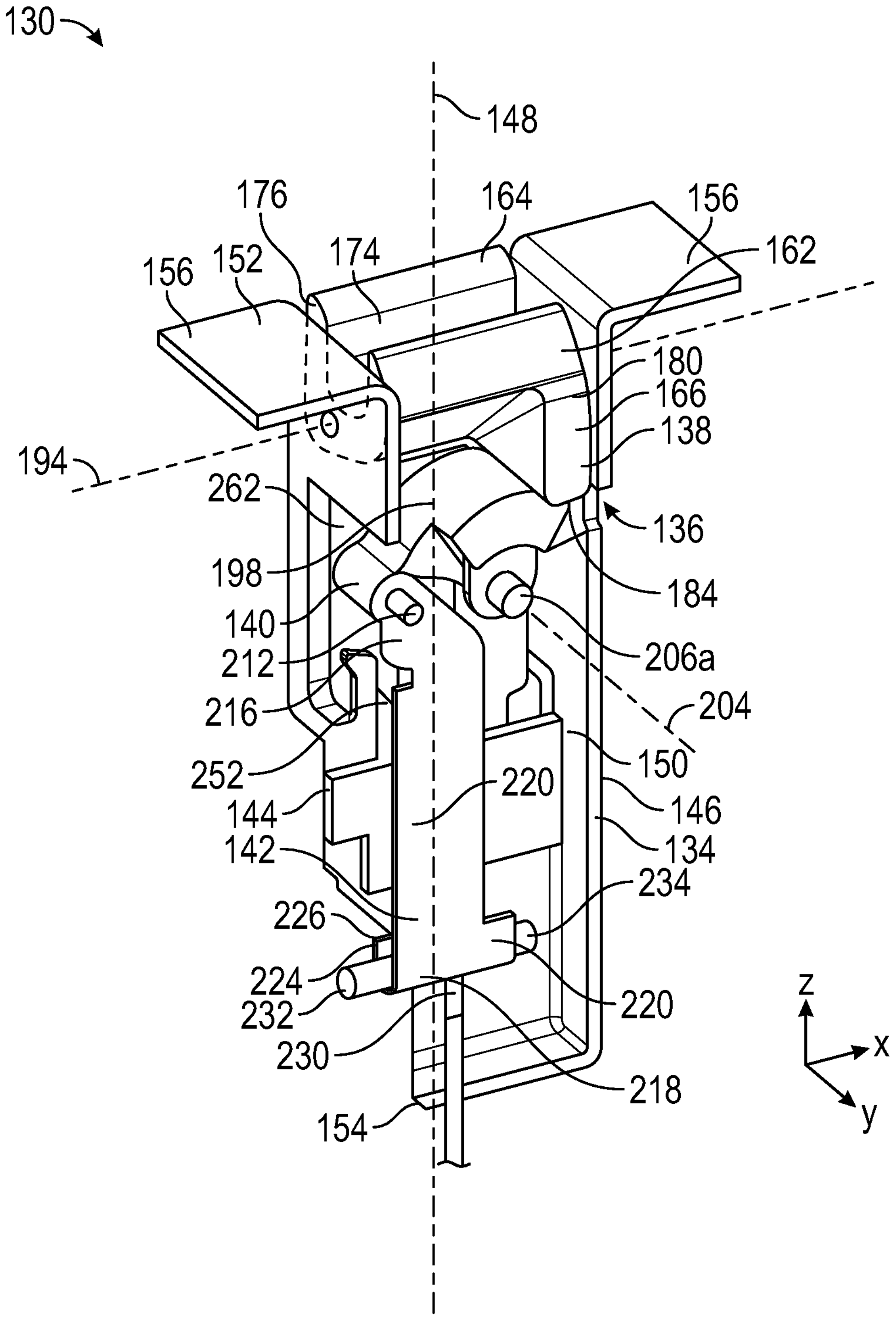
FIG. 2 illustrates a front perspective view of a latch mechanism having a latch apparatus and a cam device in first, locked positions according to an illustrated embodiment of the present invention.
Figure 3:
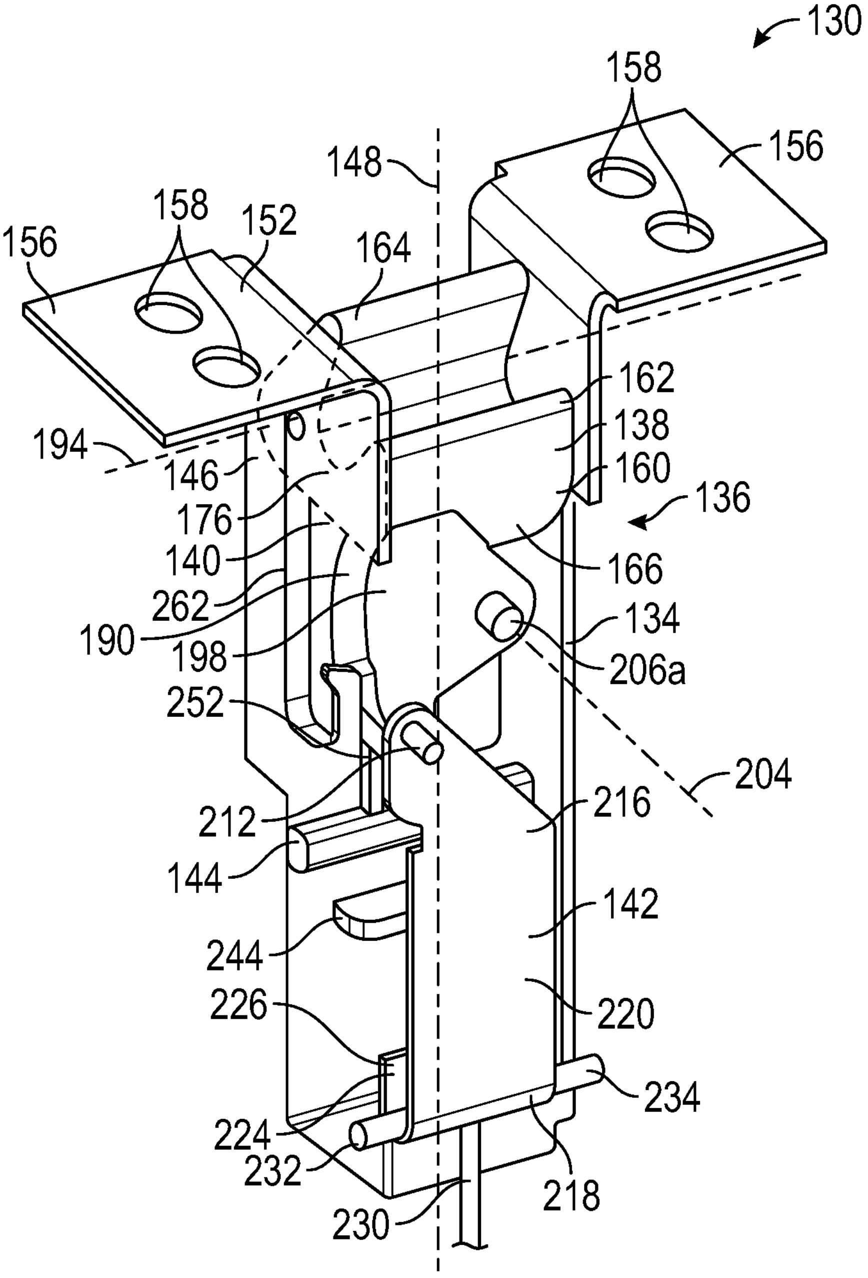
FIG. 3 illustrates a front perspective view of the latch mechanism shown in FIG. 2 with the latch apparatus and the cam device in second, unlocked positions according to an illustrated embodiment of the present invention.
Figure 4:
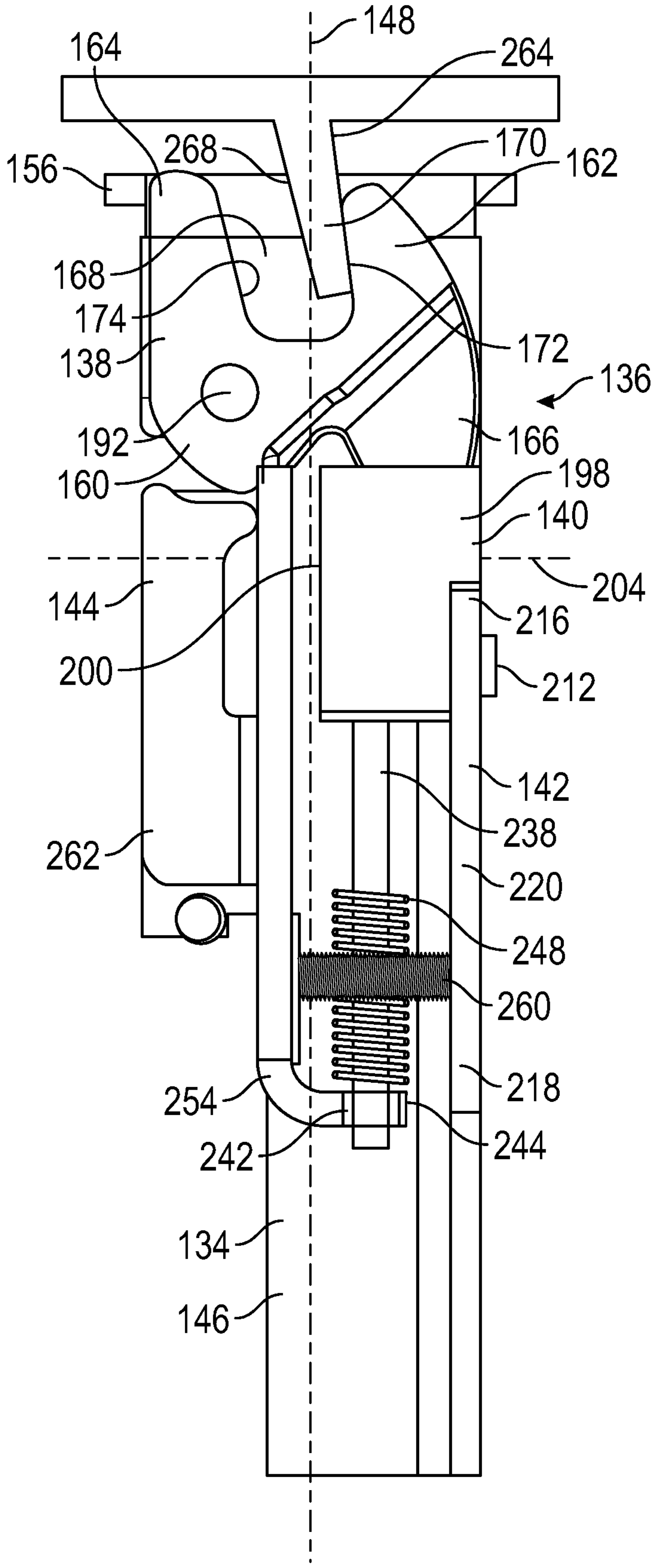
FIG. 4 illustrates a side perspective view of a latch mechanism in which the latch apparatus is engaging a door strike according to an embodiment of the present invention.

Referencing FIGS. 2-4, according to certain embodiments, a latch mechanism 130 may include a latch housing 134 and a latch assembly 136, the latch assembly 136 having a latch apparatus 138, a cam device 140, a latch link 142, and an assembly housing 144. According to the illustrated embodiment, the latch housing 134 includes a sidewall 146 arranged about a central longitudinal axis 148, the sidewall 146 configured to provide an inner region 150 that is sized to receive placement of at least a portion of the latch assembly 136. According to certain embodiments, the sidewall 146 includes a proximal end 154 and a distal end 152, the distal end 152 being configured to be secured to an edge 104, 106 of the door 102. For example, in the illustrated embodiment, the distal end 152 of the sidewall 146 may include one or more extensions 156 that are configured to be position along, or within a recess of, an edge 104, 106 of the door 102. Further, as shown in FIG. 3, the extensions 156 may include one or more fastener apertures 158 that are configured to receive insertion of a mechanical fastener, such as, for example, a screw, which at least assists in securing the latch mechanism 130 to the door 102.

Figure 7A:
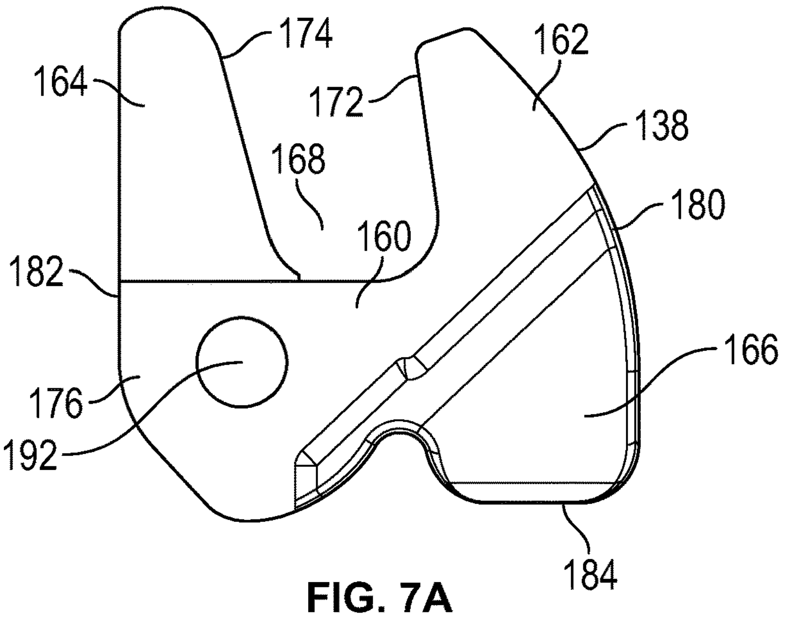
FIGS. 7A, 7B and 7C illustrate a first side view, a first side perspective view, and a top perspective view of a latch apparatus according to an illustrated embodiment of the present invention.
Figure 7B:
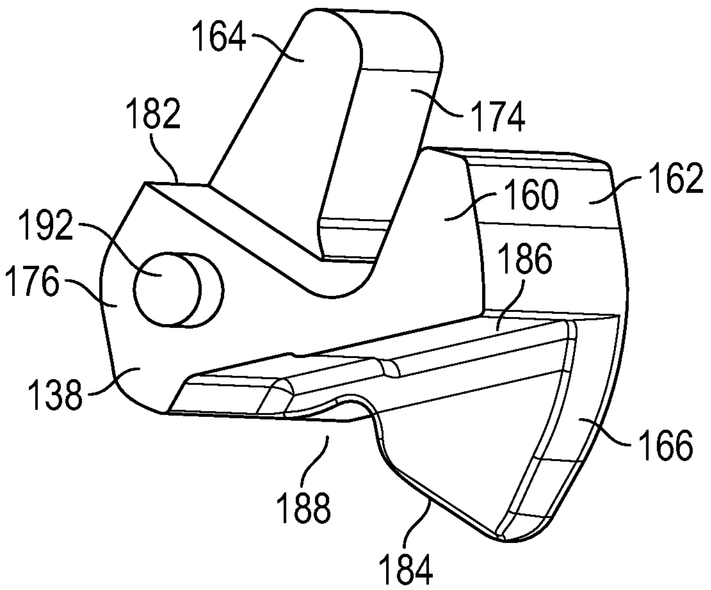
Figure 7C:
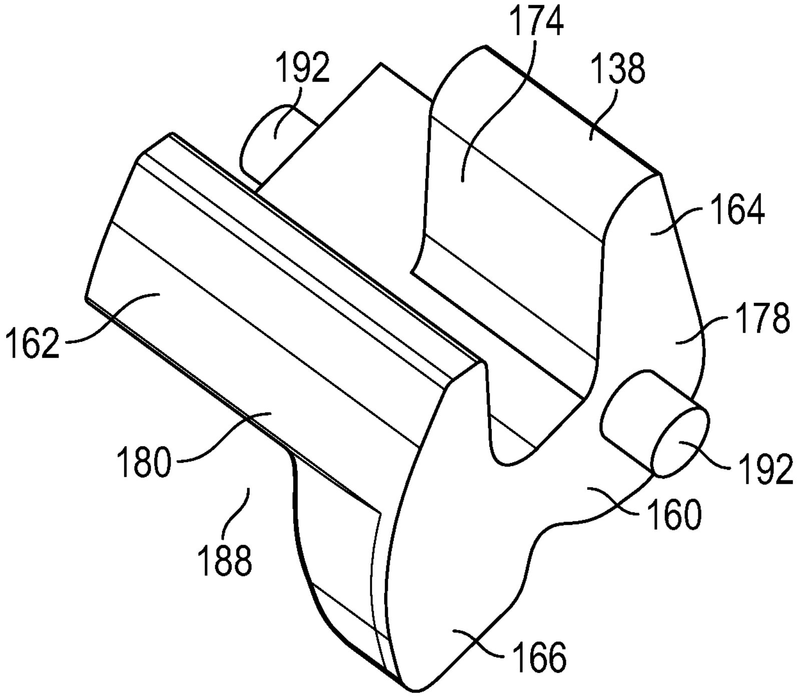

Referencing FIGS. 7A-7C, according the illustrated embodiment, the latch apparatus 138 includes a body portion 160, a first upper wall 162, a second upper wall 164, and a lower wall 166. At least a portion of the first and second upper walls 162, 164 may be separated from each other so as to provide a retention area 168 that is configured to receive the removable insertion of a door strike 170, as shown, for example, in FIG. 4. Additionally, opposing inner surfaces 172, 174 of the first and second upper walls 162, 164 may be configured to provide at least a portion of the retention area 168 with a generally "U" shape. As shown in at least FIGS. 7B and 7C, the first upper wall 162 may generally extend between opposing first and second sidewalls 176, 178 of the body portion 160 and along a front portion 180 of the latch apparatus 138, while the second upper wall 164 may extend from the second sidewall 178 along only a portion of the rear portion 182 of the latch apparatus 138.

The lower wall 166 of the latch apparatus 138 may extend from the second sidewall 178 of the latch apparatus 138 along at least a portion of the body portion 160 and/or the first upper wall 162 of the latch apparatus 138. As discussed below, the lower wall 166 may include a latch engagement surface 184 that is configured to abut against a cam surface of the cam device 140 when the latch mechanism 130 is in the first, locked position. Additionally, a portion of a bottom surface 186 of the body portion 160 and/or of the first upper wall 162 may be configured to provide a cavity 188 that is sized to receive at least a portion of a cam surface of the cam device 140 at least when the cam device 140 is pivotally displaced away from engagement with the engagement surface 184 of the latch apparatus 138.

Figure 5:
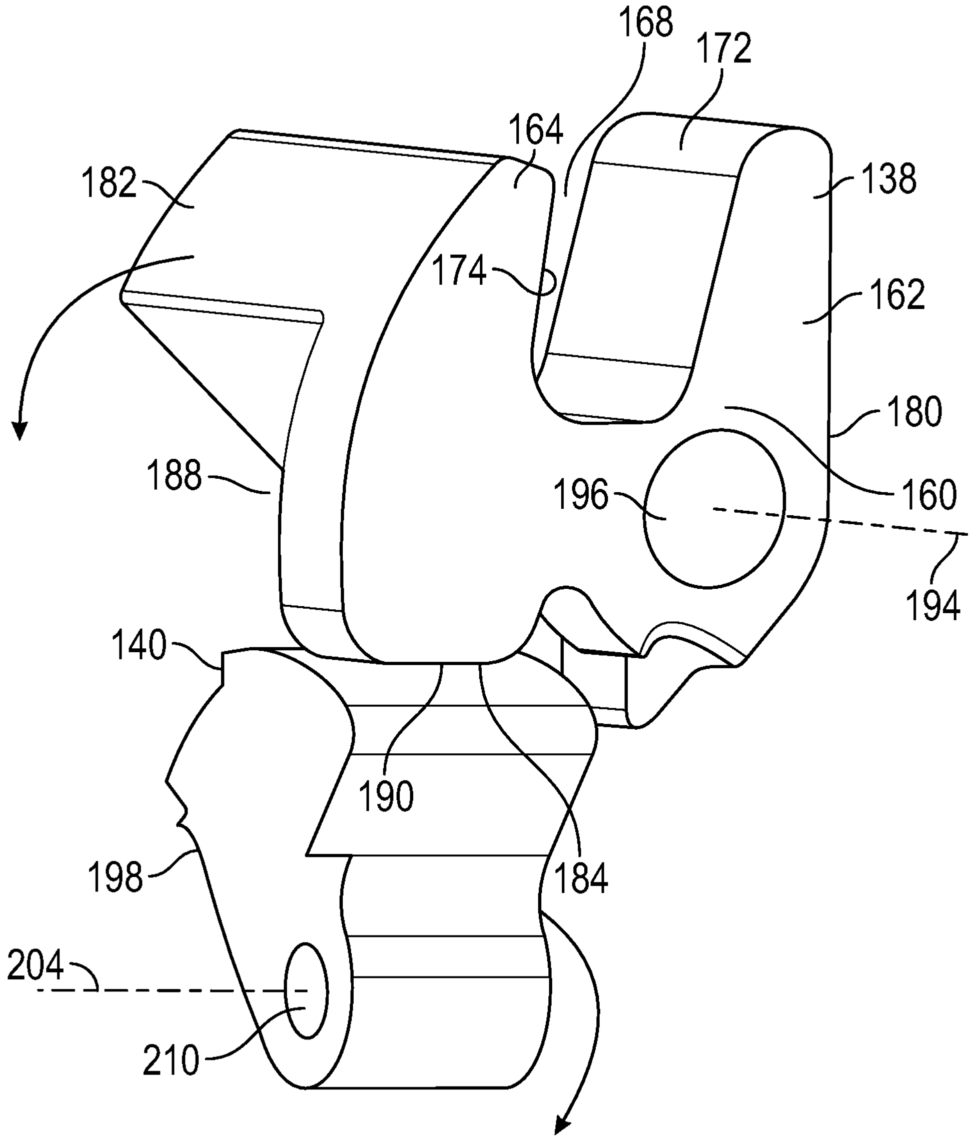
FIG. 5 illustrates a side perspective view of a latch apparatus and a cam device of a latch assembly according to an illustrated embodiment of the present invention.

The opposing first and second sidewalls 176, 178 of the body portion 160 of the latch apparatus 138 may be configured for the latch apparatus 138 to be pivotally connected to an adjacent sidewall 146 of the latch housing 134. For example, according to the illustrated embodiment, a pivot post(s) 192 may extend from the first and second sidewalls 176, 178 of the body portion 160. According to such embodiments, the pivot post(s) 192 may be configured to be received in apertures in the latch housing 134. Further, the latch apparatus 138 may be pivotally displaced using the pivot post(s) 192 about a latch axis 194 between at least a first, locked position and a second, unlocked position. Alternatively, as shown in FIG. 5, the latch apparatus 138 may include one or more apertures 196 that are configured to receive the insertion of one or more pivot posts that are operably connected to, or extend from, the sidewall 146 of the latch housing 134, and which are used form the pivotal displacement of the latch apparatus 138 about the latch axis 194.

According to the illustrated embodiment, the latch axis 194 may be generally perpendicular to the central longitudinal axis 148 of the latch mechanism 130, and may, or may not, be offset from the central longitudinal axis 148. Moreover, the pivotal movement of the latch apparatus 138 is primarily in the "Y" direction (FIG. 2), or in the general direction of the width ("W" in FIG. 1) of the door 102. Thus, according to the illustrated embodiment, the latch axis 194 may be in the general direction of the length ("L" in FIG. 1) of the door 102. Further, the configuration of the latch apparatus 138 requires relatively minimal space or area for the displacement of the latch apparatus 138 in the "Y" direction as the latch apparatus 138 is displaced from the first, locked position to the second, unlocked position, and vice versa. Thus, according to certain embodiments, the inner region 116 in the door 102 that accommodates the latch mechanism 130 may have a width (in the "Y" direction in FIGS. 1 and 2) that is approximately equal to the width of the latch apparatus 138.

Figure 8A:
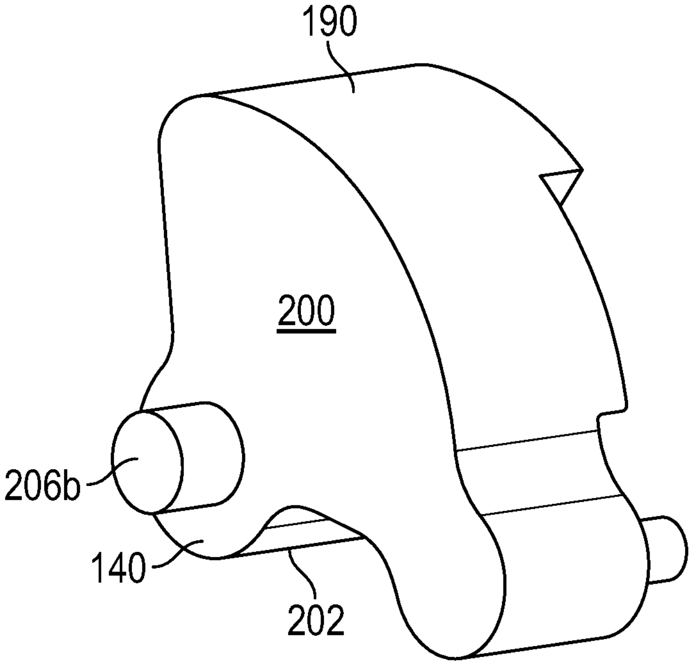
FIGS. 8A and 8B illustrate first and second side perspective views of a cam device according to an illustrated embodiment of the present invention.
Figure 8B:
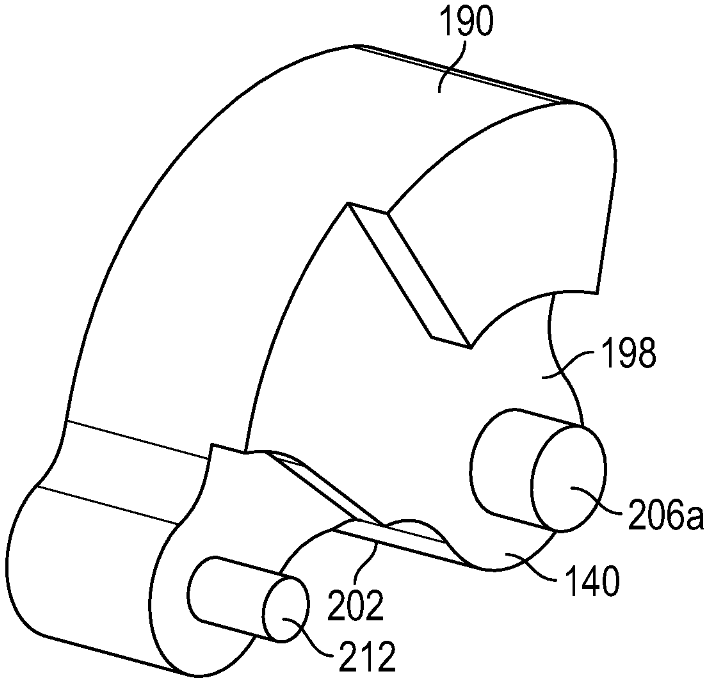

FIGS. 8A and 8B illustrate first and second side perspective views of the cam device 140 according to an illustrated embodiment of the present invention. The cam device 140 includes the cam surface 190, a front sidewall 198, a rear sidewall 200, and a bottom portion 202. In the illustrated embodiment, the cam device 140 is configured to be pivotally displaced about a transverse cam axis 204 from a first position in which the cam device 140 is engaged with the latch apparatus 138, to a second position in which the cam device 140 is disengaged with the latch apparatus 138. Moreover, in the illustrated embodiment, the cam axis 204 is a transverse axis that is offset from, and generally perpendicular to, the latch axis 194 and also at least generally perpendicular to the central longitudinal axis of the latch housing 134. Thus, as the cam device 140 is configured to be pivoted about the transverse cam axis 204 generally in "X" direction (FIGS. 1 and 2) as the cam axis 204 is generally in the direction of the width ("W" in FIG. 1) of the door 102, the inner region 150 of the door 102 generally need not be sized to accommodate the motion of the pivotal displacement of the cam device 140.

Figure 6A:
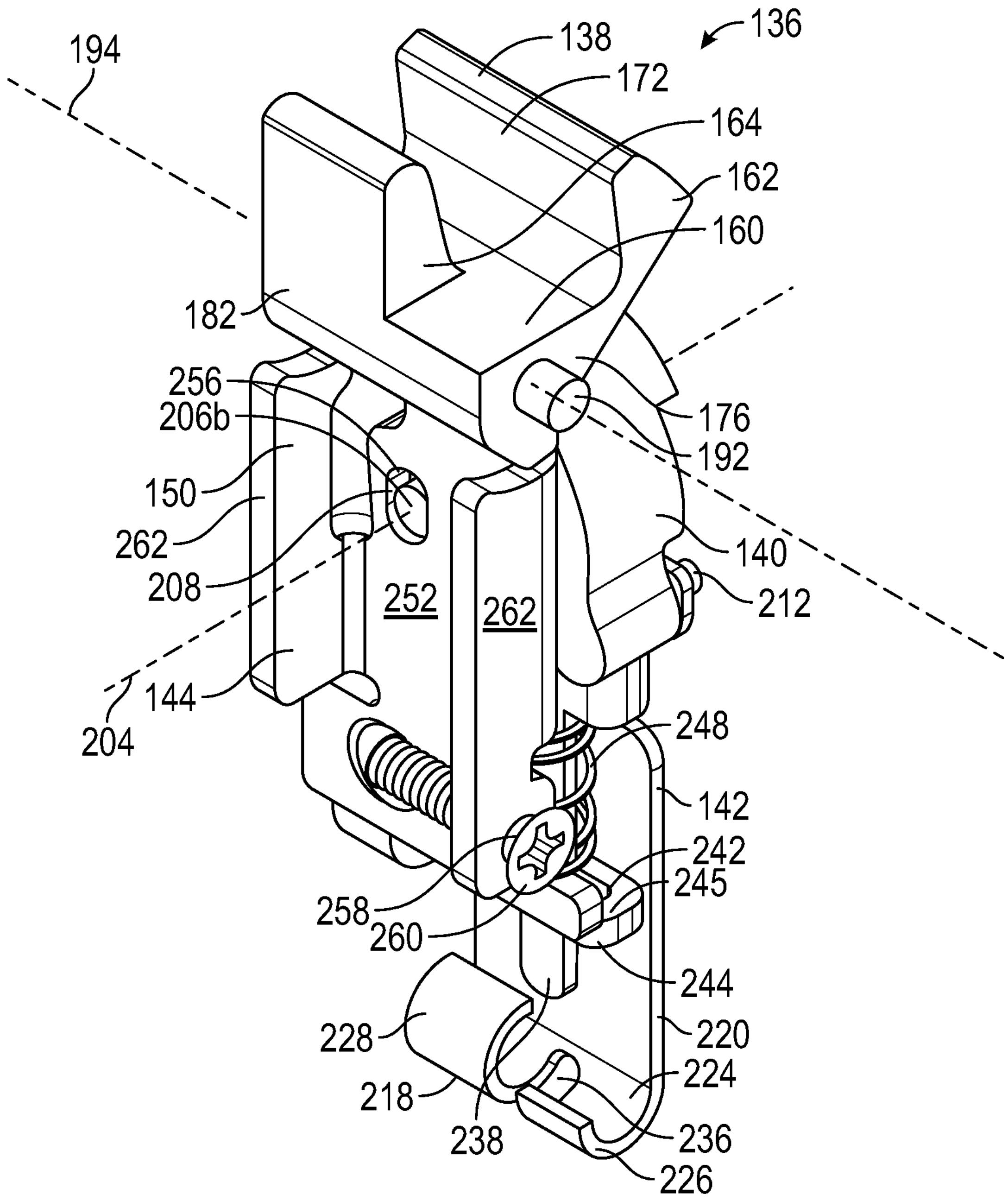
FIGS. 6A and 6B illustrate rear and front side perspective views, respectively, of a latch assembly having a latch apparatus in a first, locked position, and a cam device in a second, unlocked position according to an illustrated embodiment of the present invention.
Figure 6B:
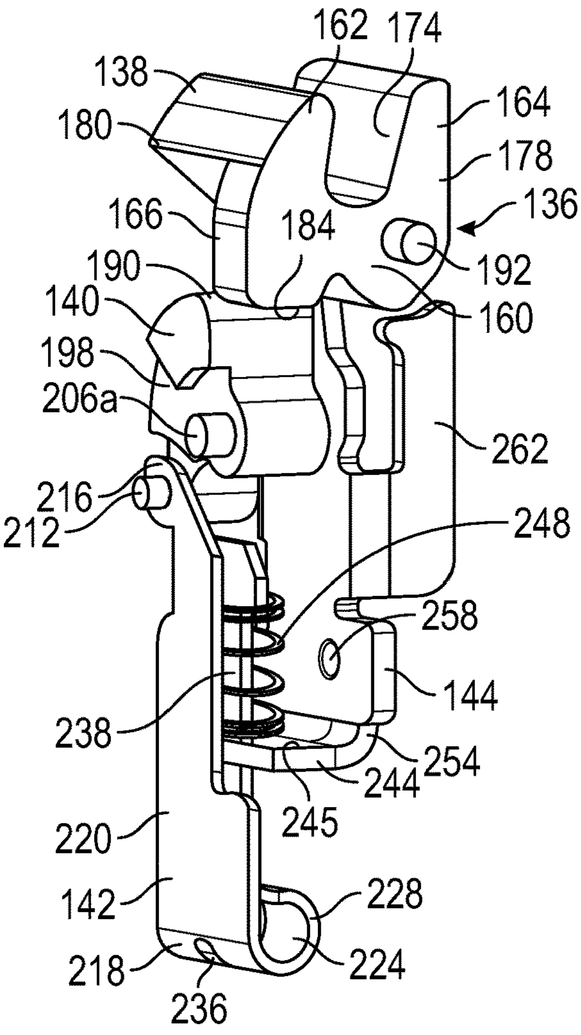

According to the illustrated embodiment, the cam device 140 is pivotally displaced about pivot shafts **206*a*, 206*b* that extend from the front and rear sidewalls 198, 200 of the cam device 140 and into an aperture in an adjacent surface. For example, as shown in FIGS. 6A and 6B, according to the illustrated embodiment, a pivot shaft 206*b* may extend from the rear sidewall 200 of the cam device 140 and into an aperture 208 in the assembly housing 144. Additionally, a pivot shaft 206*a* may extend from the front sidewall 198 of the cam device 140 and into an adjacent sidewall, such as, for example, a sidewall 146 of the latch housing 134. Alternatively, as shown in FIG. 5, the cam device 140 may include one or more apertures 210 that are configured to receive the insertion of one or more pivot shafts that are operably connected to, or extend from, the sidewall 146 of the latch housing 134 and/or the assembly housing 144**.

When in the first, engaged position, at least a portion of the cam surface 190 of the cam device 140 abuts against at least a portion of the latch engagement surface 184 of the latch apparatus 138 so as to prohibit the latch apparatus 138 from being pivotally displaced about the latch axis 194 to the second, unlocked position. When the cam device 140 is pivotally displaced to the second, disengaged position, the cam surface 190 is positioned so that at least a portion of the cam surface 190 is within the cavity 188 of the latch apparatus 138 such that the cam surface 190 does not engage with the latch engagement surface 184. Moreover, when pivotally displaced to the second, disengaged position, the cam surface 190 is positioned so as to not interfere with, or otherwise impede, the latch apparatus 138 from being able to be pivotally displaced to the second, unlocked position.

Figure 9:
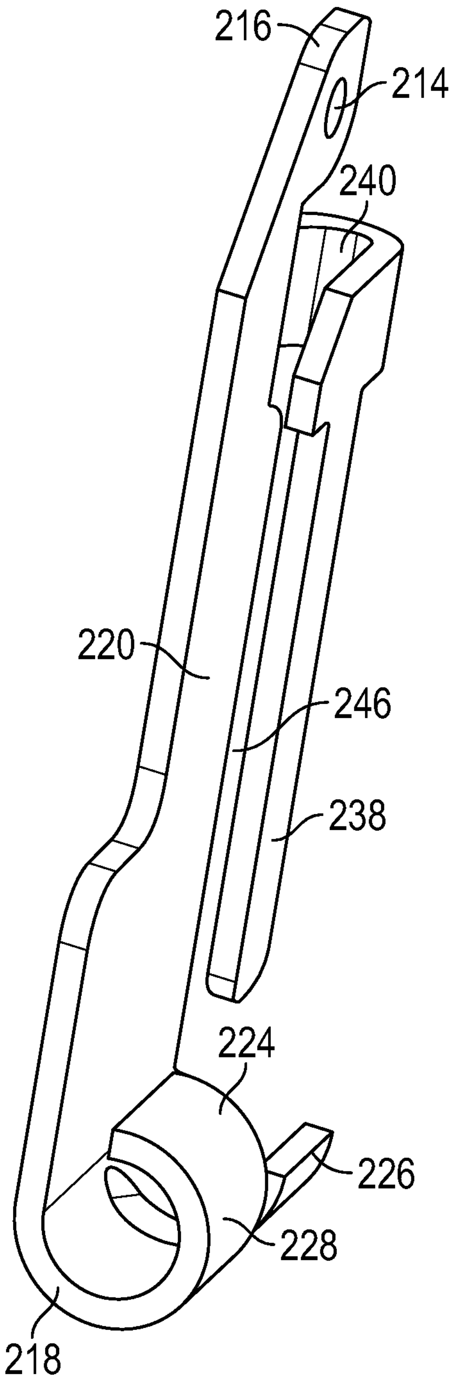
FIG. 9 illustrates a side perspective view of a latch link according to an illustrated embodiment of the present invention.

As shown in at least FIGS. 2, 3, and 6B, the cam device 140 may also include a cam protrusion 212 that extends from the front surface 198 of the cam device 140 and which is configured for operable connection with the latch link 142. For example, according to the illustrated embodiment, the cam protrusion 212 is configured to be received within an aperture 214 in a first end 216 of the latch link 142. The latch link 142, which includes a body segment 220 having the first end 216 and a second end 218, is operably connected to a pull cable 222 such that the pull cable 222 may exert a pulling force on the latch link 142 that linearly displaces the latch link 142 generally toward the center case 122 along the vertical axis ("Z" axis in FIG. 2). For example, referencing FIG. 9, a second end 218 of the latch link 142 includes a connector portion 224 that is operably connected to the pull cable 222. Moreover, according to the illustrated embodiment, the connector portion 224 includes a hook portion 226 and a retention portion 228 that are configured to receive placement of an attachment portion 230 of the pull cable 222. The attachment portion 230 may have a first extension 232 that is engaged by the hook portion 226, and an opposing second extension 234 that is placed within the retention portion 228, the retention portion 228 being configured to prevent the second extension 234 from being disengaged with the retention portion 228 in a linear direction along the vertical axis ("Z" axis in FIG. 2). The latch link 142 may also include a passage 236 configured to receive placement of a portion of the pull cable 222.

The latch link 142 further includes a guide member 238 that is configured to guide the linear displacement of the latch link 142 along the vertical axis ("Z" axis in FIG. 2). According to the illustrated embodiment, the guide member 238 is offset by an extension arm 240 from the body segment 220 of the latch link 142 so as to provide a gap 246 between the guide member 238 and the body segment 220. The guide member 238 is configured for displacement within a guide orifice 242 between an extended position, in which the cam device 140 is in the first, engagement position, and a retracted position, in which the cam device 140 is in the second, disengagement position. According to the illustrated embodiment, the guide orifice 242 is provide by a projection member 244 of the assembly housing 144, as shown, for example, in at least FIGS. 4, 6A, 6B, and 10. Alternatively, the guide orifice 242 may be provided by a projection member 244 of the latch housing 134. At least a portion of the projection member 244 may be configured to be positioned within the gap 246 of the latch link 142 so as to no interfere with the displacement of the latch link 142 between the extended and retracted positions.

The latch link 142 may be biased to the extended position by a biasing element 248, such as, for example, a spring. In the illustrated embodiment, the biasing element 248 may be positioned between at least a portion of the extension arm 240 of the latch link 142 and an upper surface 245 of the projection member 244, as shown for example, in FIGS. 6A and 6B.

Figure 10:
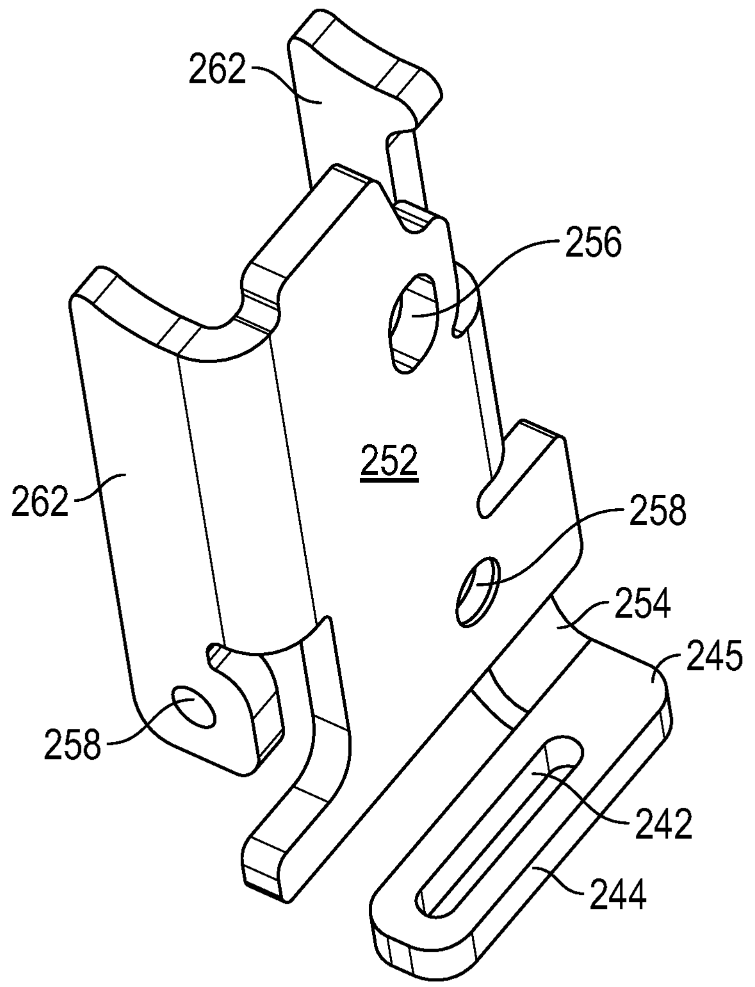
FIG. 10 illustrates a side perspective view of an assembly housing according to an illustrated embodiment of the present invention.

Referencing FIG. 10, according to the illustrated embodiment, the projection member 244 may be extended from a main body 252 of the assembly housing 144 by an extension arm 254. The main body 252 of the assembly housing 144 may include an aperture 256 configured for engagement with the pivot shaft 206*b* of the cam device 140. The main body 252 may further include one or more fastener apertures 258 that are configured to be operably connected to, or otherwise receive insertion of, mechanical fasteners 260, such as, for example, screws, bolts, or pins, that secure the assembly housing 144 to the latch housing 134. Additionally, the assembly housing 144 may include one or more sidewalls 262 that are configured to operably position the cam device 140 such that the cam surface 190 of the cam device 140 is operably positioned to engage the latch engagement surface 184 of the latch apparatus 138 when the cam device 140 is in the first, engaged position.

As shown in at least FIG. 2, when the door 102 is locked in the closed position, the latch apparatus 138 may be in the first, locked position. With the latch apparatus 138 in the first, locked position, the door strike 170 may be positioned in the retention area 168 between the first and second upper walls 162, 164 of the latch apparatus 138, as shown in FIG. 4. Further, the cam device 140 may be biased to the first, engagement position by the biasing element 248 biasing the latch link 142 to the extended position. With the cam device 140 in the first, engagement position, as shown in FIG. 2, the cam surface 190 of the cam device 140 may be positioned to prohibit the latch apparatus 138 from being displaced to the second, unlocked position. For example, according to certain embodiments, the cam surface 190 of the cam device 140 may be adjacent to, and/or abut against, the latch engagement surface 184 of the latch apparatus 138 such that the latch apparatus 138 may not be pivotally displaced to the second, unlocked position.

When the door 102 is to be opened, the push bar 108 may be depressed, which may result in the center case 122 displacing the pull cable 222 so that the pull cable 222 exerts a pull force on the latch link 142 that overcomes the biasing force of the biasing element 248. Moreover, as the latch link 142 is operably connected to the pull cable 222, such as, for example, by the attachment portion 230, a pull force via the pull cable 222 may displace the lath link 142 from the extended position and generally toward the center case 122 to a retracted position. As the latch link 142 is displaced toward the retracted position, the guide member 238 may be displaced along the guide orifice 242. Further, as the latch link 142 is operably connected to the cam device 140 via the cam protrusion 212, the displacement of the latch link 142 by the pull force may cause the displacement of the cam protrusion 212. Displacement of the cam protrusion 212 causes the cam device 140 to be pivoted about the cam axis 204 from the first, engagement position, to the second, disengagement position.

As shown in FIG. 3, with the cam device 140 in the second, disengagement position, the cam surface 190 of the cam device 140 may be positioned, for example, in the cavity 188, so that the cam device 140 no longer provides a barrier or obstacle to the displacement of the latch apparatus 138 to the second, unlocked position. Thus, with the cam device 140 in the second, disengagement position, the latch apparatus 138 may be pivotally displaced to the second, unlocked position, about the latch axis 194. The latch apparatus 138 may be displaced to the second, unlocked position in a number of different manners. For example, according to certain embodiments, the shape or size of the latch apparatus 138, as well as gravitational forces, may influence the latch apparatus 138 to pivot to the second, unlocked position when the cam device 140 is in the second, disengaged position. Further, as the door 102 is displaced away from the closed position, a first side 264 of the door strike 170 may engage an inner surface 172 of the first upper wall 162 in a manner that causes the latch apparatus 138 to pivot about the latch axis 194 to the second, unlocked position. Additionally, as shown in FIG. 3, with the latch apparatus 138 in the second, unlocked position, the lower wall 166 of the latch apparatus 138 may be positioned adjacent to the cam surface 190 of the cam device 140 in a manner that prevents the cam device 140 from returning to the first, engagement position.

When the door 102 is to return to the closed position, the latch apparatus 138 may be pivotally displaced from the second, unlocked position to the first, locked position. For example, as the door 102 returns to the closed position, the second side 268 of the door strike 170 may engage an inner surface 174 of the second upper wall 164 of the cam device 140 in a manner in which the door strike 170 provides sufficient force for the latch apparatus 138 to be pivotally displaced about the latch axis 194 back to the first, locked position. With the latch apparatus 138 in the first, locked position, the lower wall 166 of the latch apparatus 138 is no longer positioned to prevent the cam device 140 from being pivotally displaced from the second, disengaged position to the first, engaged position. Thus, when the pull force from the pull cable 222 is released, the biasing element 248 may provide sufficient force for the latch link 142 to be displaced from the retracted position to the extended position. As the latch link 142 is displaced, the guide member 238 may be displaced through the guide orifice 242. Moreover, again, as the cam protrusion 212 is operably connected to the latch link, the displacement of the cam protrusion 212 with the latch link 142 causes the cam device 140 to be pivotally displaced along the cam axis 204 from the second, disengaged position to the first, engaged position, as shown in FIG. 2. With the latch apparatus 138 in the first, locked position, and the cam device 140 in the first, engaged position, the door strike 170 may be engaged by the latch apparatus 138 in a manner that lockingly secures the door 102 in the closed position.

Figure 11:
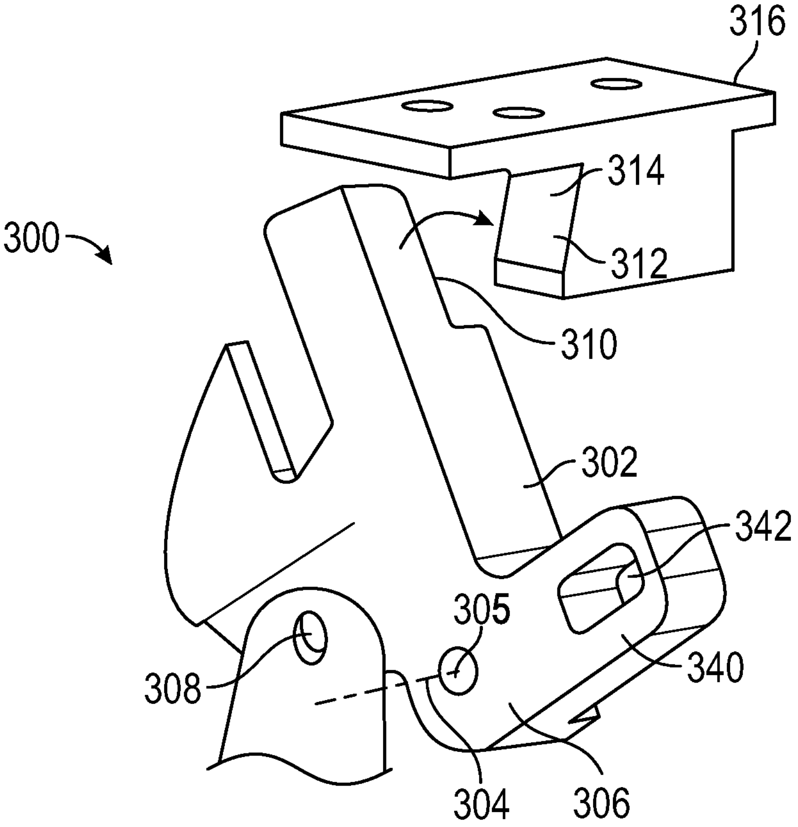
FIG. 11 illustrates a front perspective view of a latch apparatus and a door strike according to an illustrated embodiment of the present invention.
Figure 12A:
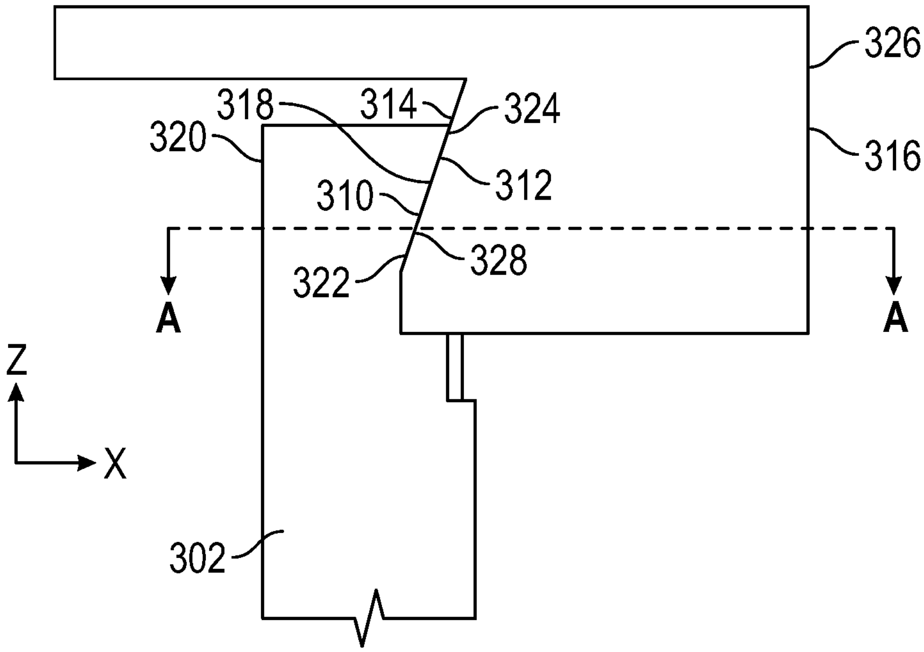
FIG. 12A illustrates a first side view of a portion of the latch apparatus and a portion of the door strike shown in FIG. 11.
Figure 12B:
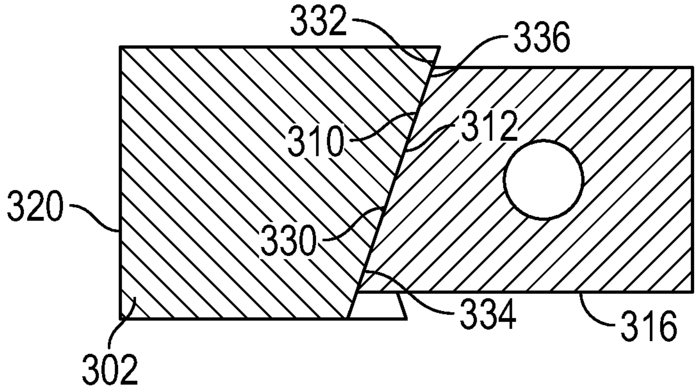
FIG. 12B illustrates a top cross sectional view of the latch apparatus and the door strike shown in FIG. 12A along line A-A.

Referencing FIGS. 11-12B, according to another embodiment, the latch assembly 300 may be configured such that the latch apparatus 302 is pivotally connected to the latch link 142, and wherein the latch apparatus 302, rather than a cam device 140, is pivotally displaced about a transverse latch axis 304 generally in the transverse direction ("X" direction in FIG. 2). Moreover, the transverse latch axis 304 is at least generally perpendicular to the central longitudinal axis of the latch housing 134 and in the general direction of the width ("W" in FIG. 1) of the door 102. According to such an embodiment, the latch apparatus 302 may have a body portion 306 having a pivot aperture 305 that is configured to engage a pivot post 307 that is operably connected to the aperture 208 in the sidewall 146 of the assembly housing 144 and/or an aperture in the latch housing 134. Alternatively, the pivot aperture 305 may be configured to receive a pivot post(s) 307 that extends from the latch housing 134 and/or the assembly housing 144.

The body portion 306 of the latch apparatus 302 may further include a link aperture 308 that is configured to operably connect the latch apparatus 302 to the latch link 142. For example, the link aperture 308 may be configured to receive a pin that extends into an aperture 214 in the latch link 142, or may include a protrusion that extends from the latch link 142 and into the link aperture 308 of the latch apparatus 302. The displacement of the latch link 142 by the pulling force of a first pull cable, such as the upper pull cable 118, may displace the latch link 142 from the extended position to the retracted position. As the latch link 142 is displaced toward the retracted position, the operable connection between the latch link 142 an the latch apparatus 302 may cause the latch apparatus 302 to be pivotally displaced about the latch axis 304 from a first, locked position, to a second, unlocked position. When the pulling force on the latch link 142 is removed, the latch link 142 may again be displaced to the extended position, such as, for example, by the biasing element 248, wherein an abutment surface 310 of the latch apparatus 302 may engage an engagement portion 312 of an inner surface 314 of a door strike 316.

In the illustrated embodiment, at least a portion of the abutment surface 310 of the latch apparatus 302 and at least a portion of the engagement portion 312 of the inner surface 314 of the door strike 316 may be mating tapered surfaces. For example, as shown in FIG. 12A, at least a portion of the abutment surface 310 of the latch apparatus 302 may be angled or taper outwardly in a first direction, such as, for example, generally in a vertical direction ("Z" direction in FIG. 12A), such that the distance between a first end 318 of the abutment surface 310 and a first side 320 of the latch apparatus 302 (as shown in FIG. 12A) is greater than the distance between a second end 322 of the abutment surface 310 and the first side 320 of the latch apparatus 302. Conversely, the door strike 316 may be outwardly tapered or angled generally in the vertical direction ("Z" direction in FIG. 12A) such that the distance between the first end 324 of the engagement portion 312 and an outer surface 326 of the door strike 316 (as shown in FIG. 12A) is less than the distance between the second end 328 of the engagement portion 312 and the outer surface 326. Such angling of the abutment surface 310 and the engagement portion 312 may enhance the engagement of the contact between the abutment surface 310 of the latch apparatus 302 and the engagement portion 312 of the door strike 316. Enhancing such an engagement may improve the ability of the latch apparatus 302 to remain in the first, locked position when the door 102 is subjected to extreme loads, such as, for example, during hurricane and windstorm testing.

Additionally, referencing FIG. 12B, the abutment surface 310 of the latch apparatus 302 and the engagement portion 312 of the door strike 316 may also be tapered in a second direction, such as, for example, generally in a horizontal direction ("X" direction in FIG. 12A). For example, the distance that an inner side 330 of the abutment surface 310 is separated from the first side 320 of the latch apparatus 302 is less than the distance between an outer side 332 of the abutment surface 310 and the first side 320 of the latch apparatus 302. Conversely, the door strike 316 may be angled or tapered generally in a horizontal direction ("X" direction in FIG. 12A) such that the distance between an inner side 334 of the engagement portion 312 and the outer surface 326 of the door strike 316 is greater than the distance between an outer side 336 of the engagement portion 312 and the outer surface 326 of the door strike 316. Such angling or tapering of the abutment surface 310 of the latch apparatus 302 and the engagement portion 312 of the door strike 316 may reduce the amount of force needed to displace the latch apparatus from the first, locked position when the door 102 is under relatively high loads, such as, for example, loads associated with hurricane and windstorm forces.

The door strike 316 may also be configured to engage the abutment surface 310 at the lowest possible location without interfering with the ability to displace the latch apparatus 302 from the first, locked position and/or to not interfere with the ability to displace the door 102 from the closed position when the latch apparatus 302 is in the second, unlocked position. The relatively low positioning of the engagement between the engagement portion 312 of the door strike 316 with the abutment surface 310 of the latch apparatus 302 may reduce the torque on the latch apparatus 302, and thereby improve the load capacity of the latch apparatus 302.

The body portion 306 of the latch apparatus 302 may further include a cable connection member 338 that is configured to at least assist in holding another latch mechanism in an unlocked position. Moreover, the cable connection member 338 may be configured to provide a pull force for the second cable when the latch apparatus 302 is displaced to the second, unlocked position via a pulling force provided by a first pull cable 222. For example, according to embodiments in which the latch apparatus 302 is part of the top latch mechanism 110, the cable connection member 338 may be configured to at least assist in displacing, and/or holding, the bottom latch mechanism 112 in an unlocked position. Moreover, the cable connection member 338 may be configured to be operably connected to the lower pull cable 120 such that, when the latch apparatus 302 is displaced to the second, unlocked position via a pulling force provided by the upper pull cable 118, the cable connection member 338 is displaced to a position that causes a pulling force to be exerted on the bottom latch mechanism 112 that withdraws at least a component of the bottom latch mechanism 112 from a locked or extended position to a unlocked or retracted position.

According to the illustrated embodiment, the cable connection member 338 includes an extension body 340 that extends away from the body portion 306, and which includes a connection orifice 342 that may be operably connected to the second cable. Further, the cable connection member 338 is configured such that the connection between the cable connection member 338 and the second pull cable is in closer proximity to the adjacent edge of the door 102 when the latch apparatus 302 is in the second, unlocked position than when the latch apparatus 302 is in the first, locked position so that, latch apparatus 302 is in the second, unlocked position, a pulling force is exert on the second cable that is used to retract or unlock the other latch mechanism.

Figure 13:
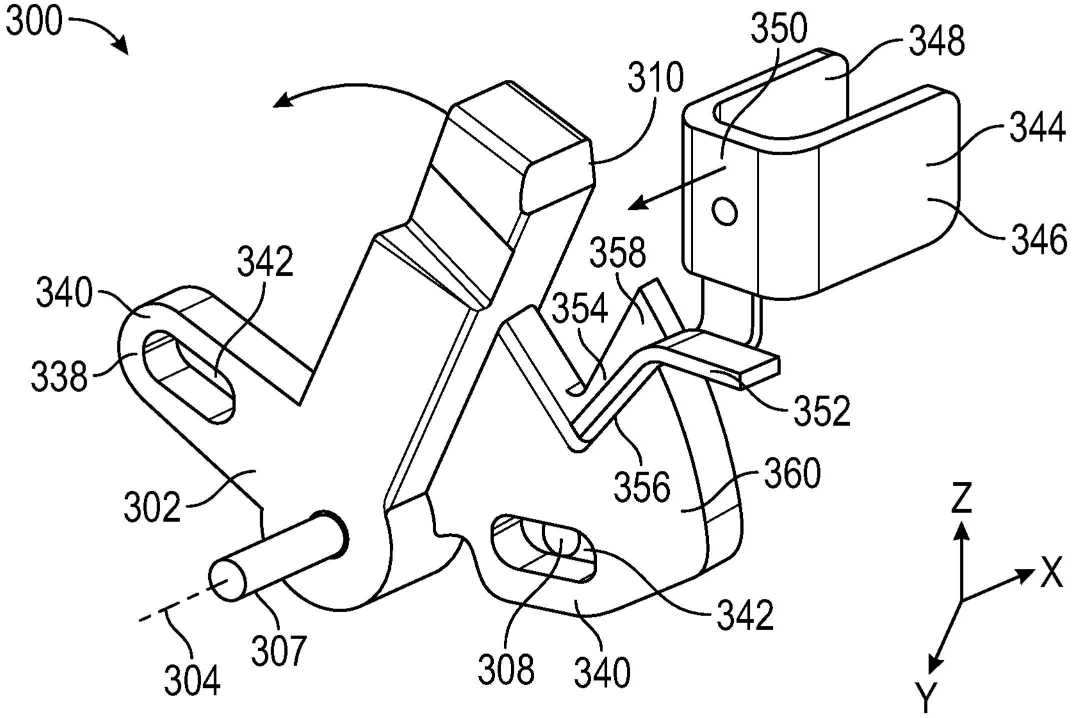
FIG. 13 illustrates a side perspective view of a portion of a latch assembly that includes a hold open mechanism according to an illustrated embodiment of the present invention.

Referencing FIG. 13, according to certain embodiments, the latch mechanism 130 may further include a hold open mechanism 344 that is configured to retain the latch apparatus 302 in the second, unlocked position so that the cable connection member 338 continues to be positioned to maintain a pull force on the second cable. For example, by using the hold open mechanism 344 to hold the latch apparatus 302 in the second, unlocked position, the cable connection member 338 continues to be positioned to maintain a pull force on the lower pull cable 120 that is used to displace one or more components of the bottom latch mechanism 112 to an unlocked position. By maintaining the pull force on the lower pull cable 120, the bottom latch mechanism 112 may be held in the unlocked position, such as, for example, a latch bolt 114 of the bottom latch mechanism 112 may be retained in a retracted position, until the latch apparatus 302 is returned to the first, locked position, such as when the door 102 is displaced to the closed position.

According to the illustrated embodiment, the hold open mechanism 344 may include a first extension 346 and a second extension 348 that generally extend axially (“Y” direction in FIGS. 2 and 13) from a face portion 350 of the hold open mechanism 344. Additionally, the first and second extensions 346, 348 may be configured to at least temporarily extend from an exterior surface 132 of the door 102 so as to abut against an adjacent surface, such as, for example, a door frame, when the door 102 is at least initially displaced to the closed position. The hold open mechanism 344 may further include a finger portion 352 that is configured to be received within a cavity 354 of the latch apparatus and/or to abut against a retention surface 356 of the latch apparatus 302. Additionally, according to certain embodiments, the latch apparatus 302 may further include a retention wall 358 that is configured to assist in the placement of the finger portion 352 so as to at least assist in maintaining the finger portion 352 in operable engagement with the retention surface 356 when the latch apparatus 302 is to be held by the hold open mechanism 344 in the second, unlocked position.

The hold open mechanism 344 is configured to be axially displaced in the “Y” direction (FIGS. 2 and 13) between a first, retention position and a second, release position. Moreover, according to certain embodiments, the hold open mechanism 344 is generally configured to be displaced in a direction that is generally parallel to the transverse latch axis 304 about which the latch apparatus 302 is pivotally displaced. When the door 102 is in the closed position, the latch apparatus 302 may be in the first, locked position, the hold open mechanism 344 may be in the second, release position, as the retention surface 356 and/or cavity 354 may not be positioned for engagement with, or to receive placement of, the finger portion 352 of the hold open mechanism 344. For example, when the latch apparatus 302 is in the first, locked position, the finger portion 352 may be adjacent to and/or abutted against a sidewall 360 of the latch apparatus 302.

When the latch apparatus 302 is displaced to the second, unlocked position, the latch apparatus 302 may be pivotally displaced so that the retention surface 356 is positioned for engagement with, and/or the cavity 354 is positioned to receive placement of, the finger portion 352. Accordingly, the hold open mechanism 344 may then be axially displaced in the “Y” direction (FIGS. 2 and 13) to the first, retention position, as the finger portion 352 may enter into engagement with the retention surface 356. According to certain embodiments, the hold open mechanism 344 may be biased, such as, for example, by a biasing element, including a spring, among other biasing elements, to the first retention position. The degree of axial displacement of the finger portion 352 however may be limited by the retention wall 358 so as to at least attempt to ensure that, when displaced to the first position, the finger portion 352 is not displaced beyond the retention surface 356. Further with the hold open mechanism 344 in the first, retention position, at least a portion of the first and second extensions 346, 348 may extend beyond an exterior surface 132 of the door 102. When the door 102 is subsequently placed in a closed position, and with a portion of the first and second extensions 346, 348 protruding from the exterior surface 132 of the door 102, the first and second extensions 346, 348 may come into contact with an adjacent surface, such as, for example, the door frame. Such contact may axially displaced the hold open mechanism 344 from the first, retention position to the second, release position, thereby releasing the finger portion 352 from engagement with the retention surface 356. Further, the latch apparatus 302 may then be pivotally displaced from the second, unlocked position to the first, locked position. With the latch apparatus 302 returned to the first, locked position, the cable connection member 338 may be positioned to release the pull force on the second cable that may have been holding the other latch mechanism, such as the bottom latch mechanism 112, in the unlocked position. Further, with the latch apparatus 302 again in the first, locked position, the retention surface 356 and/or cavity 354 may not be positioned to be engagement with, or receive placement of, the finger portion 352 of the hold open mechanism 344.

Various features and advantages of the present invention are set forth in the following claims. Additionally, changes and modifications to the described embodiments described herein will be apparent to those skilled in the art, and such changes and modifications can be made without departing from the spirit and scope of the present invention and without diminishing its intended advantages. While the present invention has been illustrated and described in detail in the drawings and foregoing description, the same is to be considered illustrative and not restrictive in character, it being understood that only selected embodiments have been shown and described and that all changes, equivalents, and modifications that come within the scope of the inventions described herein or defined by the following claims are desired to be protected.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A latch mechanism configured for mounting to a door, the latch mechanism comprising:

a housing;

a latchbolt movably mounted to the housing for movement between a latching position and an unlatching position, wherein the latchbolt is mounted to the housing for pivotal movement about a first axis; and a blocking member movably mounted to the housing for movement between a blocking position and an unblocking position, wherein the blocking member is configured to retain the latchbolt in the latching position when the blocking member is in the blocking position, wherein the blocking member is mounted to the housing for pivotal movement about a second axis, and wherein the first axis and the second axis are transverse to one another; and wherein, with the latch mechanism mounted to the door, the latchbolt in the latching position, and the blocking member in the unblocking position, the latchbolt is configured to move to the unlatching position in response to movement of the door from a closed position to an open position.

2. The latch mechanism of claim 1, wherein the housing is configured for mounting within the door.

3. The latch mechanism of claim 1, wherein the latchbolt comprises a channel.

4. A system comprising the latch mechanism of claim 3, the system further comprising a strike configured for mounting to a doorframe adjacent the door; and wherein the strike comprises a projection sized and shaped for receipt in the channel.

5. The system of claim 4, wherein the projection is configured to move the latchbolt from the latching position to the unlatching position during opening of the door, and to move the latchbolt from the unlatching position to the latching position during closing of the door.

6. A system, comprising:

a latch mechanism configured for mounting to a door, the latch mechanism comprising:

a latchbolt having a latching position and an unlatching position, the latchbolt comprising a channel, wherein the latchbolt is pivotable about a first axis; and a blocking member operable to selectively retain the latch in the latching position, wherein the blocking member is pivotable about a second axis transverse to the first axis; and a strike configured for mounting to a doorframe adjacent the door, the strike comprising a projection sized and shaped to be received in the channel;

wherein the system has an installed state in which the latch mechanism is mounted to the door, and the strike is mounted to the doorframe;

wherein, with the system in the installed state, the door in a closed position, the latchbolt in the latching position, and the blocking member in a blocking position, the projection is received in the channel, and the system prevents opening of the door; and wherein, with the system in the installed state, the door in a closed position, the latchbolt in the latching position, and the blocking member in an unblocking position, opening of the door is permitted, and opening of the door causes the strike to move the latchbolt to the unlatching position.

7. The system of claim 6, wherein, with the system in the installed state and the door in an open position, the latchbolt remains in the unlatching position.

8. The system of claim 7, wherein the strike is configured to return the latchbolt to the latching position during closing of the door.

9. The system of claim 6, wherein the latch mechanism further comprises a link operable to move the blocking member between the blocking position and the unblocking position; and wherein the latchbolt is movable independently of the link when the blocking member is in the blocking position.

10. The system of claim 6, wherein the latch mechanism further comprises a housing;

wherein the latchbolt is pivotably mounted to the housing for pivotal movement about a first axis;

wherein the blocking member is pivotably mounted to the housing for pivotal movement about a second axis; and wherein the first axis and the second axis are transverse to one another.

11. The system of claim 6, wherein the blocking member is biased toward the blocking position.

12. A method of operating a closure assembly comprising a latch mechanism mounted to a door and a strike mounted to a doorframe, the method comprising:

with the door in an open position and a latchbolt of the latch mechanism in an unlatching position, engaging the strike with the latchbolt in response to movement of the door to a closed position, thereby causing the strike to pivot the latchbolt about a first axis to a latching position; and with the door in the closed position and the latchbolt in the latching position, pivoting a blocking member of the latch mechanism about a second axis from an unblocking position to a blocking position, thereby retaining the latchbolt in the latching position and causing the strike to prevent opening of the door; and wherein the first axis and the second axis are transverse to one another.

13. The method of claim 12, wherein engaging the strike with the latchbolt comprises causing a projection of the strike to enter a channel of the latchbolt.

14. The method of claim 12, further comprising moving the blocking member between the blocking position and the unblocking position in response to actuation of a manual actuator mounted to the door.

15. The method of claim 12, further comprising:

moving the blocking member from the blocking position to the blocking position, thereby permitting the latchbolt to move from the latching position to the unlatching position; and during opening of the door, causing the strike to move the latchbolt from the latching position to the unlatching position.

16. The method of claim 15, further comprising retaining the latchbolt in the unlatching position while the door remains open.

* * * * *